(12) United States Patent
Fieldsend et al.

(10) Patent No.: US 12,190,286 B2
(45) Date of Patent: Jan. 7, 2025

(54) BUILDING-INTEGRATED LOT MANAGEMENT SYSTEM

(71) Applicant: ATALLAH GROUP INC., Montréal (CA)

(72) Inventors: Chelsea Fieldsend, Montréal (CA); Sam-Nicolai Johnston, Montréal (CA); Cedric Guillemette, Montréal (CA); Darlington Prauchner, Montréal (CA); Marc Renault, Montréal (CA); Ronan Leroux, Montréal (CA); Catherine Couturier, Montréal (CA); Vincent Ho-Tin-Noe, Montréal (CA); Tuan Bach Quoc, Montréal (CA); Chris Kergin, Montréal (CA); Dan Shah, Montréal (CA); Rami Atallah, Montréal (CA)

(73) Assignee: ATALLAH GROUP INC., Montréal (CA)

( * ) Notice: Subject to any disclaimer, the term of this patent is extended or adjusted under 35 U.S.C. 154(b) by 511 days.

(21) Appl. No.: 17/594,835

(22) PCT Filed: Apr. 30, 2019

(86) PCT No.: PCT/CA2019/050567
§ 371 (c)(1),
(2) Date: Oct. 30, 2021

(87) PCT Pub. No.: WO2020/220108
PCT Pub. Date: Nov. 5, 2020

(65) Prior Publication Data
US 2022/0188758 A1    Jun. 16, 2022

(51) Int. Cl.
*G06Q 10/087* (2023.01)
*G06Q 30/0601* (2023.01)
*G06Q 10/0875* (2023.01)

(52) U.S. Cl.
CPC ....... *G06Q 10/087* (2013.01); *G06Q 30/0625* (2013.01); *G06Q 30/0633* (2013.01); *G06Q 30/0639* (2013.01); *G06Q 30/0641* (2013.01)

(58) Field of Classification Search
CPC ............. G06Q 10/087; G06Q 30/0625; G06Q 30/0633; G06Q 30/0639; G06Q 30/0641;
(Continued)

(56) References Cited

U.S. PATENT DOCUMENTS 10,878,486 B1 * 12/2020 Aflalo ................... H04W 4/33
2004/0117528 A1    6/2004 Beacher et al.
(Continued)

FOREIGN PATENT DOCUMENTS

CA     2901424 A1     8/2014
WO  WO-2020220108 A1  11/2020

OTHER PUBLICATIONS

"European Application Serial No. 19927151.1, Supplementary European Search Report mailed Jul. 29, 2022", 8 pgs.
(Continued)

*Primary Examiner* — Garcia Ade
(74) *Attorney, Agent, or Firm* — Schwegman Lundberg & Woessner, P.A.

(57) ABSTRACT

Preparing items for a customer in advance of a fitting session. After receiving preliminary item selections, determining a fitting date and time at a fitting location. Then, determining a final item selection from the preliminary item selections not more than 48 hours before the fitting session. The customer does not commit to purchase the final item selection. After determination of the final item selection, locking the final item selection and locating the preliminary items between multiple locations and, using an automated mechanical system, assembling the preliminary items into a lot before sorting the lot into transfer bin(s). Then, transfer-
(Continued)

ring the bin to the fitting location in advance of the fitting session. At the date of the session, before the time of the session, preparing a final lot from the transferred bin and storing the prepared final lot in a temporary storage system operating in the building at the fitting location.

40 Claims, 4 Drawing Sheets

(58) Field of Classification Search
CPC ............... G06Q 30/0601; G06Q 10/08; G06Q 10/0633; G06Q 10/10
USPC .......................................................... 705/28
See application file for complete search history.

(56) References Cited

U.S. PATENT DOCUMENTS

| | | | |
|---|---|---|---|
| 2013/0083065 A1* | 4/2013 | Schulze | G06Q 30/06 345/633 |
| 2015/0100433 A1 | 4/2015 | Choy et al. | |
| 2016/0236867 A1* | 8/2016 | Brazeau | B25J 5/007 |
| 2017/0270574 A1* | 9/2017 | Hessurg | G06Q 30/0601 |
| 2018/0282066 A1 | 10/2018 | Wagner et al. | |

OTHER PUBLICATIONS

Millnes, Hilary, "Offline, Ssense puts a new spin on the department store", [online]. [retrieved on Jul. 20, 2022]. Retrieved from the Internet: <URL: https://www.glossy.co/store-of-the-future/offline-ssense-puts-a-new-spin-on-the-department-store/>, (May 1, 2018), 5 pgs.

"International Application No. PCT/CA2019/050567, International Preliminary Report on Patentability dated May 3, 2021", (May 3, 2021), 19 pgs.

"International Application No. PCT/CA2019/050567, International Search Report and Written Opinion mailed Jan. 3, 2020", (Jan. 3, 2020), 8 pgs.

* cited by examiner

BUILDING-INTEGRATED LOT MANAGEMENT SYSTEM

PRIORITY CLAIM TO RELATED APPLICATIONS

This application is a U.S. national stage filing under 35 U.S.C. § 371 from International Application No. PCT/CA2019/050567, filed on 30 Apr. 2019, and published as WO2020/220108 on 5 Nov. 2020, the benefit of priority of which is claimed herein, and which application is hereby incorporated herein by reference in its entirety.

TECHNICAL FIELD

The present invention relates to inventory management solutions and, more particularly, to proactive inventory management solutions.

BACKGROUND

Traditional retail inventory management requires availability of any given product in a wide range of options (choice of sizes, colors, accessories, etc.) at all selling locations where the product is made available for sale. As multiple products are made available for sale at each location, a large inventory is maintained at each selling location. Such an inventory management solution answers the need for customers to try-on the product before buying.

Current internet-based shopping does not allow to try-on any products before buying. At best, flexible return policies are put in place to compensate for that problem.

The present invention is concerned with providing additional flexibility to customers wishing to try-on products selected through an internet-based shopping portal without having to pay in advance of the final selection.

SUMMARY

The summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the present disclosure relates to a computing platform configured for preparing items for a customer in advance of a customer fitting session. The computing platform may include a non-transient computer-readable storage medium having executable instructions embodied thereon. The computing platform may include one or more hardware processors configured to execute the instructions. The processor(s) may execute the instructions to receive one or more preliminary item selections from the customer through an online portal. The processor(s) may execute the instructions to determine a fitting date and time for the customer fitting session at a fitting location. The processor(s) may execute the instructions to determine the final item selection from the last of the one or more preliminary item selections not more than 48 hours before the fitting session. In some embodiments, determining the final item selection may be performed not more than between 1 hour and 24 hours. The final item selection includes a plurality of items from an available assortment of items. The available assortment of items may be maintained between a plurality of locations including at least the fitting location and a warehouse location. The customer does not commit to purchase any of the items in the final item selection. The processor(s) may execute the instructions to, after determination of the final item selection, lock the one or more items in the final item selection from the available assortment of items and locate each of the preliminary items between the plurality of locations in an electronic inventory system. The processor(s) may execute the instructions to, after determination of the final item selection, using an automated mechanical system, assemble the preliminary items located at the warehouse location into a lot. The processor(s) may execute the instructions to, after determination of the final item selection and using the automated mechanical system, sort the lot into at least one transfer bin. The processor(s) may execute the instructions to, after determination of the final item selection, mark the at least one bin for transfer from the warehouse location to the fitting location in advance of the date and time of the fitting session. The processor(s) may execute the instructions to, at the date of the fitting session, before the time of the fitting session, prepare a final lot at the fitting location from the transferred at least one bin. The processor(s) may execute the instructions to, at the date of the fitting session, before the time of the fitting session, store the prepared final lot in a temporary storage system operating in the building at the fitting location.

In some implementations of the computing platform, the processor(s) may execute the instructions to, after preparing the final lot and using an automated storage and retrieval system of the temporary storage system, deliver the final lot to a fitting room in the building at the fitting location.

In some implementations of the computing platform, the processor(s) may execute the instructions to, after determination of the final item selection, flag unavailable ones of the preliminary items.

In some implementations of the computing platform, the processor(s) may execute the instructions to, before determining the final item selection, modify the last of the one or more preliminary item selections by modifying at least one of the items therein considering one or more past purchases from the customer.

In some implementations of the computing platform, modifying the last of the one or more preliminary item may include adding different sizes of an item in the last of the one or more preliminary item selections.

In some implementations of the computing platform, modifying the last of the one or more preliminary item may include adding different models of an item in the last of the one or more preliminary item selections.

In some implementations of the computing platform, modifying the last of the one or more preliminary item may include adding one or more different products in relation to an item in the last of the one or more preliminary item selections.

In some implementations of the computing platform, the processor(s) may execute the instructions to, after the fitting session, return unselected items from the final lot into the temporary storage system. In some implementations of the computing platform, the processor(s) may execute the instructions to, after the fitting session, unlock the unselected items from the available assortment of items, In some implementations of the computing platform, the processor(s) may execute the instructions to, after the fitting session, transfer the unselected items from the temporary storage system towards the warehouse location.

In some implementations of the computing platform, returning the unselected items from the final lot into the temporary storage system may be performed using a rejection bin outside of the automated storage and retrieval system of the temporary storage system and transferring the unselected items from the temporary storage system towards the warehouse location may include transferring the rejection bin from the fitting location to the warehouse location.

Another aspect of the present disclosure relates to a method for preparing items for a customer in advance of a customer fitting session. The method may include receiving one or more preliminary item selections from the customer through an online portal. The method may include determining a fitting date and time for the customer fitting session at a fitting location. The method may include determining the final item selection from the last of the one or more preliminary item selections not more than 48 hours before the fitting session. In some embodiments, determining the final item selection may be performed not more than between 1 hour and 24 hours. The final item selection may include a plurality of items from an available assortment of items. The available assortment of items may be maintained between a plurality of locations including at least the fitting location and a warehouse location. The customer does not commit to purchase any of the items in the final item selection. The method may include, after determination of the final item selection, locking the one or more items in the final item selection from the available assortment of items and locating each of the preliminary items between the plurality of locations in an electronic inventory system. The method may include, after determination of the final item selection and using an automated mechanical system, assembling the preliminary items located at the warehouse location into a lot. The method may include, after determination of the final item selection, using the automated mechanical system, sorting the lot into at least one transfer bin. The method may include, after determination of the final item selection, transferring the at least one bin from the warehouse location to the fitting location in advance of the date and time of the fitting session. The method may include, at the date of the fitting session, before the time of the fitting session, preparing a final lot at the fitting location from the transferred at least one bin. The method may include, at the date of the fitting session, before the time of the fitting session, storing the prepared final lot in a temporary storage system operating in the building at the fitting location.

In some implementations of the method, it may include further including, after preparing the final lot and using an automated storage and retrieval system of the temporary storage system, delivering the final lot to a fitting room in the building at the fitting location.

In some implementations of the method, it may include further including, after determination of the final item selection, flagging unavailable ones of the preliminary items.

In some implementations of the method, it may include further including, before determining the final item selection, modifying the last of the one or more preliminary item selections by modifying at least one of the items therein considering one or more past purchases from the customer.

In some implementations of the method, modifying the last of the one or more preliminary item may include adding different sizes of an item in the last of the one or more preliminary item selections.

In some implementations of the method, modifying the last of the one or more preliminary item may include adding different models of an item in the last of the one or more preliminary item selections.

In some implementations of the method, modifying the last of the one or more preliminary item may include adding one or more different products in relation to an item in the last of the one or more preliminary item selections.

In some implementations of the method, it may include, after the fitting session, returning unselected items from the final lot into the temporary storage system. In some implementations of the method, it may include, after the fitting session, unlocking the unselected items from the available assortment of items. In some implementations of the method, it may include, after the fitting session, transferring the unselected items from the temporary storage system towards the warehouse location.

In some implementations of the method, returning the unselected items from the final lot into the temporary storage system is performed using a rejection bin outside of the automated storage and retrieval system of the temporary storage system and transferring the unselected items from the temporary storage system towards the warehouse location may include transferring the rejection bin from the fitting location to the warehouse location.

Yet another aspect of the present disclosure relates to a system configured for preparing items for a customer in advance of a customer fitting session. The system may include one or more hardware processors configured by machine-readable instructions. The processor(s) may be configured to execute an online portal that receives one or more preliminary item selections from the customer through an online portal, determines a fitting date and time for the customer fitting session at a fitting location and determines the final item selection from the last of the one or more preliminary item selections not more than 48 hours before the fitting session. In some embodiments, determining the final item selection may be performed not more than between 1 hour and 24 hours. The final item selection may include a plurality of items from an available assortment of items. The available assortment of items may be maintained between a plurality of locations including at least the fitting location and a warehouse location. The customer does not commit to purchase any of the items in the final item selection. The processor(s) may be configured to, after determination of the final item selection, lock the one or more items in the final item selection from the available assortment of items and locate each of the preliminary items between the plurality of locations in an electronic inventory system. The processor(s) may be configured to, after determination of the final item selection and using an automated mechanical system, assemble the preliminary items located at the warehouse location into a lot. The processor(s) may be configured to, after determination of the final item selection and use the automated mechanical system, sort the lot into at least one transfer bin. The processor(s) may be configured to, after determination of the final item selection, mark the at least one bin for transfer from the warehouse location to the fitting location in advance of the date and time of the fitting session. The processor(s) may be configured to, at the date of the fitting session, before the time of the fitting session, prepare a final lot at the fitting location from the transferred at least one bin. The processor(s) may be configured to, at the date of the fitting session, before the time of the fitting session, store the prepared final lot in a temporary storage system operating in the building at the fitting location.

In some implementations of the system, the processor(s) may be configured to after preparing the final lot and using an automated storage and retrieval system of the temporary storage system, deliver the final lot to a fitting room in the building at the fitting location.

In some implementations of the system, the processor(s) may be configured to after determination of the final item selection, flag unavailable ones of the preliminary items.

In some implementations of the system, the processor(s) may be configured to before determining the final item selection, modify the last of the one or more preliminary item selections by modifying at least one of the items therein considering one or more past purchases from the customer.

In some implementations of the system, modifying the last of the one or more preliminary item may include adding different sizes of an item in the last of the one or more preliminary item selections.

In some implementations of the system, modifying the last of the one or more preliminary item may include adding different models of an item in the last of the one or more preliminary item selections.

In some implementations of the system, modifying the last of the one or more preliminary item may include adding one or more different products in relation to an item in the last of the one or more preliminary item selections.

In some implementations of the system, the processor(s) may be configured to, after the fitting session, return unselected items from the final lot into the temporary storage system. In some implementations of the system, the processor(s) may be configured to, after the fitting session, unlock the unselected items from the available assortment of items. In some implementations of the system, the processor(s) may be configured to, after the fitting session, transfer the unselected items from the temporary storage system towards the warehouse location.

In some implementations of the system, returning the unselected items from the final lot into the temporary storage system may be performed using a rejection bin outside of the automated storage and retrieval system of the temporary storage system and transferring the unselected items from the temporary storage system towards the warehouse location may include transferring the rejection bin from the fitting location to the warehouse location.

Still another aspect of the present disclosure relates to a non-transient computer-readable storage medium having instructions embodied thereon, the instructions being executable by one or more processors to perform a method for preparing items for a customer in advance of a customer fitting session. The method may include receiving one or more preliminary item selections from the customer through an online portal. The method may include determining a fitting date and time for the customer fitting session at a fitting location. The method may include determining the final item selection from the last of the one or more preliminary item selections not more than 48 hours before the fitting session. In some embodiments, determining the final item selection may be performed not more than between 1 hour and 24 hours. The final item selection may include a plurality of items from an available assortment of items. The available assortment of items may be maintained between a plurality of locations including at least the fitting location and a warehouse location. The customer may not commit to purchase any of the items in the final item selection. The method may include, after determination of the final item selection, locking the one or more items in the final item selection from the available assortment of items and locating each of the preliminary items between the plurality of locations in an electronic inventory system. The method may include, after determination of the final item selection, using an automated mechanical system, assembling the preliminary items located at the warehouse location into a lot. The method may include, after determination of the final item selection, using the automated mechanical system, sorting the lot into at least one transfer bin. The method may include, after determination of the final item selection, transferring the at least one bin from the warehouse location to the fitting location in advance of the date and time of the fitting session. The method may include, at the date of the fitting session, before the time of the fitting session, preparing a final lot at the fitting location from the transferred at least one bin. The method may include, at the date of the fitting session, before the time of the fitting session, storing the prepared final lot in a temporary storage system operating in the building at the fitting location.

In some implementations of the computer-readable storage medium, the method may further include, after preparing the final lot and using an automated storage and retrieval system of the temporary storage system, delivering the final lot to a fitting room in the building at the fitting location.

In some implementations of the computer-readable storage medium, the method may further include, after determination of the final item selection, flagging unavailable ones of the preliminary items.

In some implementations of the computer-readable storage medium, the method may further include, before determining the final item selection, modifying the last of the one or more preliminary item selections by modifying at least one of the items therein considering one or more past purchases from the customer.

In some implementations of the computer-readable storage medium, modifying the last of the one or more preliminary item may include adding different sizes of an item in the last of the one or more preliminary item selections.

In some implementations of the computer-readable storage medium, modifying the last of the one or more preliminary item may include adding different models of an item in the last of the one or more preliminary item selections.

In some implementations of the computer-readable storage medium, modifying the last of the one or more preliminary item may include adding one or more different products in relation to an item in the last of the one or more preliminary item selections.

In some implementations of the computer-readable storage medium, the method may include, after the fitting session, returning unselected items from the final lot into the temporary storage system. In some implementations of the computer-readable storage medium, the method may include, after the fitting session, unlocking the unselected items from the available assortment of items. In some implementations of the computer-readable storage medium, the method may include, after the fitting session, transferring the unselected items from the temporary storage system towards the warehouse location.

In some implementations of the computer-readable storage medium, returning the unselected items from the final lot into the temporary storage system may include using a rejection bin outside of the automated storage and retrieval system of the temporary storage system and transferring the unselected items from the temporary storage system towards the warehouse location may include transferring the rejection bin from the fitting location to the warehouse location.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Further features and exemplary advantages of the present invention will become apparent from the following detailed description, taken in conjunction with the appended drawings, in which.

DETAILED DESCRIPTION

Traditional retail inventory management is insufficient to fully support the appointment-based shopping experience proposed herein. Most of the existing appointment booking options do not offer flexibility to the customer. For instance, users cannot select the items they want to try on; changing the appointment details is a painful process (e.g., done by email or phone); if specific items are requested, they may or may not be available at the time of appointment; tracking and follow-up is inconsistent. Further, the retailer may be disadvantaged in that, for instance, product selection, item transfer, and tracking are to be done manually. In many cases, they are limited to the stock available at the appointment location. In addition, clients do not have an easy way to change or cancel their appointment, resulting in 'no-shows' and wasted resources.

The new technologies allow for a high level of customization in stocks exchanged for appointment based shopping experiences by individual customers and personal stylists of customers from various warehouse and other storage locations to a shopping location while limiting the manipulation of stocks in all locations. More specifically, the stocks are prepared at the warehouse or other storage locations in lots that are associated to customers. The lots can then be delivered from each warehouse or other storage location in advance of an appointment time selected by a retail customer(s) to the shopping location before being distributed to specific customer stations at the shopping location. Technically, the solution that has been implemented is based on bins being loaded at various warehouse and other storage locations with customer-specific lots of goods. When a bin arrives at the shopping location, it is sorted and or stored in accordance with its contents and with one or more appointment time for the associated customer(s). The bin is thereafter located, retrieved and delivered at the right moment to the proper station(s) in the building at the shopping location using a Vertical Lift Module. The new technologies have led to improved efficiency in stock management aimed at supporting appointment-based shopping experiences while minimizing errors in the lots being presented to customers.

Figure 1:
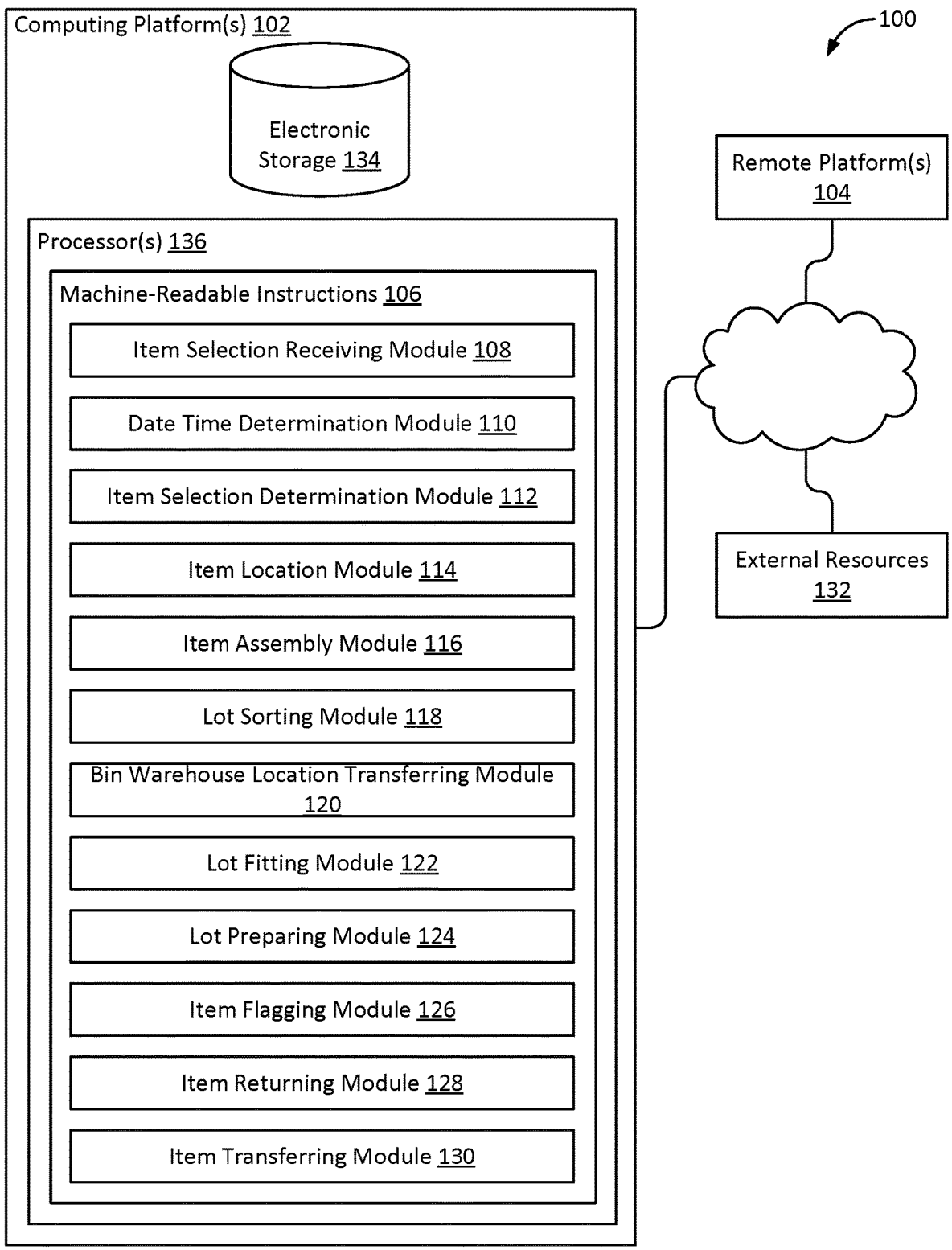
FIG. 1 illustrates a system configured for preparing items for a customer in advance of a customer fitting session, in accordance with one or more implementations.

FIG. 1 illustrates a system 100 configured for preparing items for a customer in advance of a customer fitting session, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of item selection receiving module 108, item selection determination module 112, item location module 114, item assembly module 116, lot sorting module 118, bin warehouse location transferring module 120, lot fitting module 122, lot preparing module 124, item flagging module 126, item returning module 128, item transferring module 130, and/or other instruction modules.

Item selection receiving module 108 may be configured to receive one or more preliminary item selections from the customer through an online portal. The online portal offers the necessary network and data storage infrastructure for a new or existing customer to make one or more selection among a list of items offered for sale therethrough. The list of items may be maintained in a database linked to the online portal. Availability of the items may be determined outside of the online portal as will be shown hereinbelow. The customer may have a profile with the seller of the items, which is used to suggest or otherwise influence behavior of the online portal, but the customer may also be a new customer. The customer profile may include past buying experiences (e.g., brands previously bought in what size/model, etc.) and may also include preferences determined from past experiences or provided by the customer (e.g., preferred sizes, preferred sizes, preferred colors, etc.)

Modifying the last of the one or more preliminary item may include adding different sizes of an item in the last of the one or more preliminary item selections (e.g., automatically or manually adding different shoe sizes of the same model selected by the customer, which may further be based on profile information for the customer). Modifying the last of the one or more preliminary item may include adding different models of an item in the last of the one or more preliminary item selections (e.g., automatically or manually adding different shoe models of the same size selected by the customer, which may further be based on profile information for the customer). Modifying the last of the one or more preliminary item may include adding one or more different products in relation to an item in the last of the one or more preliminary item selections (e.g., automatically or manually adding complementary products and/or trendy products, which may further be based on profile information for the customer or from general trend determined for a group of customers).

Date time determination module 110 may be configured to determine a fitting date and time for the customer fitting session at a fitting location. For instance, the schedule for a given fitting location may be used to suggest a fitting f=date and time to the customer. The schedule for the fitting location may also be taken into account to determine a common availability with a schedule provided by the customer and/or a stylist selected or assigned to the customer.

Item selection determination module 112 may be configured to determine the final item selection from the last of the one or more preliminary item selections not more than 48 hours before the fitting session. Determining the final item selection involves confirming the preliminary selection based, for instance, on availability of the items listed therein at the time of determining the final selection. In some embodiments, determining the final item selection may be performed not more than between 1 hour and 24 hours. For instance, when a very important person schedules an appointment, it may be possible to expedite treatment of the subsequent actions to ensure that the appointment time may be placed in the next hour. In other instances, enhancements and improvement may be made to the subsequent actions to ensure that the appointment time can be placed in the next 24 hours or even 12 hours. While the 48-hour value is selected based on experience of the inventors and processes currently deployed, skill persons will recognize that the extent of the improvement and enhancements that can be made to the subsequent actions may allow reduction of the 48-hour value to any value in the range between 1 hour and 24 hours. The final item selection may include a plurality of items from an available assortment of items (e.g., from a networked item database). The available assortment of items may be maintained between a plurality of locations including at least the fitting location and a warehouse location (e.g., an actual warehouse or any location under partial or complete control of the seller where items are stored and made available for sale). The customer does not commit to purchase any of the items in the final item selection prior to the fitting session, which allows for a greater flexibility for the customer while making the selection. The sale is therefore concluded in person during and/or after the fitting session, when the customer is present at the shopping location.

Item selection determination module 112 may be configured to, before determining the final item selection, modify the last of the one or more preliminary item selections by modifying at least one of the items therein considering one or more past purchases from the customer (e.g., from the customer profile).

Item location module 114 may be configured to, after determination of the final item selection, locate each of the preliminary items between the plurality of locations in an electronic inventory system (e.g., networked item database).

Item location module 114 may be configured to, after locating each of the preliminary items between the plurality of locations in the electronic inventory system, assemble the preliminary items located at a photo shoot location into a second lot.

Item location module 114 may be configured to, after locating each of the preliminary items between the plurality of locations in the electronic inventory system, sort the second lot into at least one additional transfer bin.

Item location module 114 may be configured to, after locating each of the preliminary items between the plurality of locations in the electronic inventory system, transfer the at least one additional bin from the photo shoot location to the fitting location in advance of the date and time of the fitting session. Item assembly module 116 may be configured to, after determination of the final item selection, use an automated mechanical system, assembling the preliminary items located at the warehouse location into a lot (e.g., automated warehouse management system).

Lot sorting module 118 may be configured to, after determination of the final item selection and using the automated mechanical system, sort the lot into at least one transfer bin.

Bin warehouse location transferring module 120 may be configured to, after determination of the final item selection, transfer the at least one bin from the warehouse location to the fitting location in advance of the date and time of the fitting session (e.g., using any relevant transport system such as dedicated trucks or courier services).

Lot fitting module 122 may be configured to, at the date of the fitting session, before the time of the fitting session, prepare a final lot at the fitting location from the transferred at least one bin.

Lot fitting module 122 may be configured to, at the date of the fitting session, before the time of the fitting session, store the prepared final lot in a temporary storage system operating in the building at the fitting location (e.g., building-integrated VLM).

Lot preparing module 124 may be configured to, after preparing the final lot, use an automated storage and retrieval system of the temporary storage system, delivering the final lot to a fitting room in the building at the fitting location (e.g., physically making the bin available in a different physical location in the building).

Item flagging module 126 may be configured to, after determination of the final item selection, flagging unavailable ones of the preliminary items (e.g., change of status, because of a sale of otherwise, between the time when the preliminary selection was made by the customer and the time of the final item selection).

Item returning module 128 may be configured to, after the fitting session, return unselected items from the final lot into the temporary storage system. Returning the unselected items from the final lot into the temporary storage system including using a rejection bin outside of the automated storage and retrieval system of the temporary storage system. Transferring the unselected items from the temporary storage system towards the warehouse location may include transferring the rejection bin from the fitting location to the warehouse location.

Item transferring module 130 may be configured to, after the fitting session, transfer the unselected items from the temporary storage system towards the warehouse location.

In some implementations, server(s) 102, client computing platform(s) 104, and/or external resources 132 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s)

102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute modules 108, 110, 112, 114, 116, 118, 120, 122, 124, 126, 128, and/or 130, and/or other modules. Processor(s) 136 may be configured to execute modules 108, 110, 112, 114, 116, 118, 120, 122, 124, 126, 128, and/or 130, and/or other modules by software; hardware; firmware; some combination of software, hardware, and/or firmware; and/or other mechanisms for configuring processing capabilities on processor(s) 136. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, and/or 130 are illustrated in FIG. 1 as being implemented within a single processing unit, in implementations in which processor(s) 136 includes multiple processing units, one or more of modules 108, 110, 112, 114, 116, 118, 120, 122, 124, 126, 128, and/or 130 may be implemented remotely from the other modules. The description of the functionality provided by the different modules 108, 110, 112, 114, 116, 118, 120, 122, 124, 126, 128, and/or 130 described below is for illustrative purposes, and is not intended to be limiting, as any of modules 108, 110, 112, 114, 116, 118, 120, 122, 124, 126, 128, and/or 130 may provide more or less functionality than is described. For example, one or more of modules 108, 110, 112, 114, 116, 118, 120, 122, 124, 126, 128, and/or 130 may be eliminated, and some or all of its functionality may be provided by other ones of modules 108, 110, 112, 114, 116, 118, 120, 122, 124, 126, 128, and/or 130. As another example, processor(s) 136 may be configured to execute one or more additional modules that may perform some or all of the functionality attributed below to one of modules 108, 110, 112, 114, 116, 118, 120, 122, 124, 126, 128, and/or 130.

FIGS. 2A, 2B, 2C, 2D, 2E and/or 2F illustrate a method 200 for preparing items for a customer in advance of a customer fitting session, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A, 2B, 2C, 2D, 2E and/or 2F and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Figure 2A:
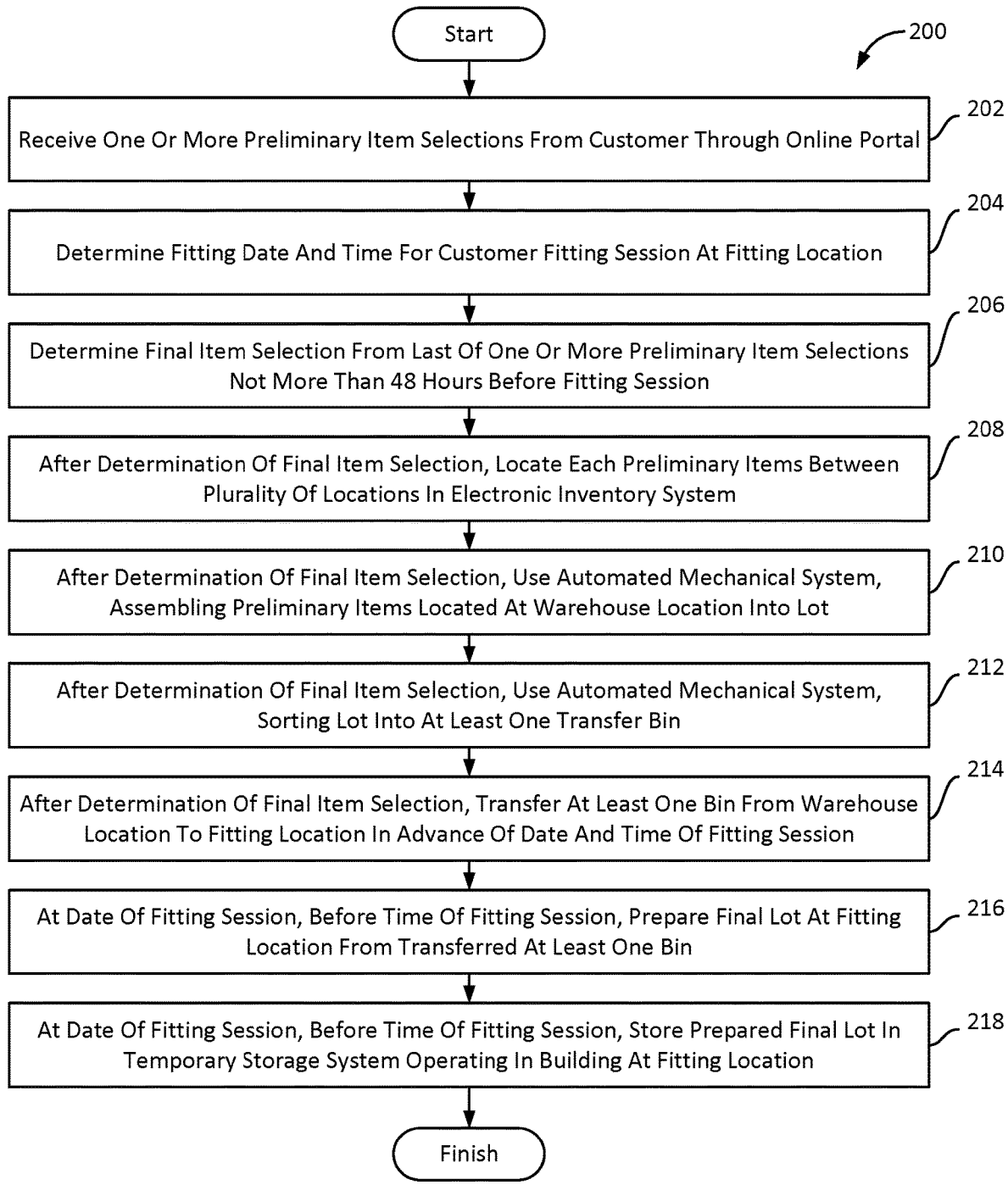
FIGS. 2A, 2B, 2C, 2D, 2E and/or 2F illustrate a method for preparing items for a customer in advance of a customer fitting session, in accordance with one or more implementations.

FIG. 2A illustrates method 200, in accordance with one or more implementations.

An operation 202 may include receiving one or more preliminary item selections from the customer through an online portal. Operation 202 may be performed by one or more hardware processors configured by machine-readable instructions including a module that is the same as or similar to item selection receiving module 108, in accordance with one or more implementations.

An operation 204 may include determining a fitting date and time for the customer fitting session at a fitting location. Operation 204 may be performed by one or more hardware processors configured by machine-readable instructions including a module that is the same as or similar to date time determination module 110, in accordance with one or more implementations.

An operation 206 may include determining the final item selection from the last of the one or more preliminary item selections not more than 48 hours before the fitting session. In some embodiments, determining the final item selection may be performed not more than between 1 hour and 24 hours. The final item selection may include a plurality of items from an available assortment of items. The available assortment of items may be maintained between a plurality of locations including at least the fitting location and a warehouse location. The customer not may commit to purchase any of the items in the final item selection. Operation 206 may be performed by one or more hardware processors configured by machine-readable instructions including a module that is the same as or similar to item selection determination module 112, in accordance with one or more implementations.

An operation 208 may include after determination of the final item selection, locating each of the preliminary items between the plurality of locations in an electronic inventory system. Operation 208 may be performed by one or more hardware processors configured by machine-readable instructions including a module that is the same as or similar to item location module 114, in accordance with one or more implementations.

An operation 210 may include after determination of the final item selection, using an automated mechanical system, assembling the preliminary items located at the warehouse location into a lot. Operation 210 may be performed by one or more hardware processors configured by machine-readable instructions including a module that is the same as or similar to item assembly module 116, in accordance with one or more implementations.

An operation 212 may include after determination of the final item selection, using the automated mechanical system, sorting the lot into at least one transfer bin. Operation 212 may be performed by one or more hardware processors configured by machine-readable instructions including a module that is the same as or similar to lot sorting module 118, in accordance with one or more implementations.

An operation 214 may include after determination of the final item selection, transferring the at least one bin from the warehouse location to the fitting location in advance of the date and time of the fitting session. Operation 214 may be performed by one or more hardware processors configured by machine-readable instructions including a module that is the same as or similar to bin warehouse location transferring module 120, in accordance with one or more implementations.

An operation 216 may include at the date of the fitting session, before the time of the fitting session, preparing a final lot at the fitting location from the transferred at least one bin. Operation 216 may be performed by one or more hardware processors configured by machine-readable instructions including a module that is the same as or similar to lot fitting module 122, in accordance with one or more implementations.

An operation 218 may include at the date of the fitting session, before the time of the fitting session, storing the prepared final lot in a temporary storage system operating in the building at the fitting location. Operation 218 may be performed by one or more hardware processors configured by machine-readable instructions including a module that is the same as or similar to lot fitting module 122, in accordance with one or more implementations.

Figure 2B:
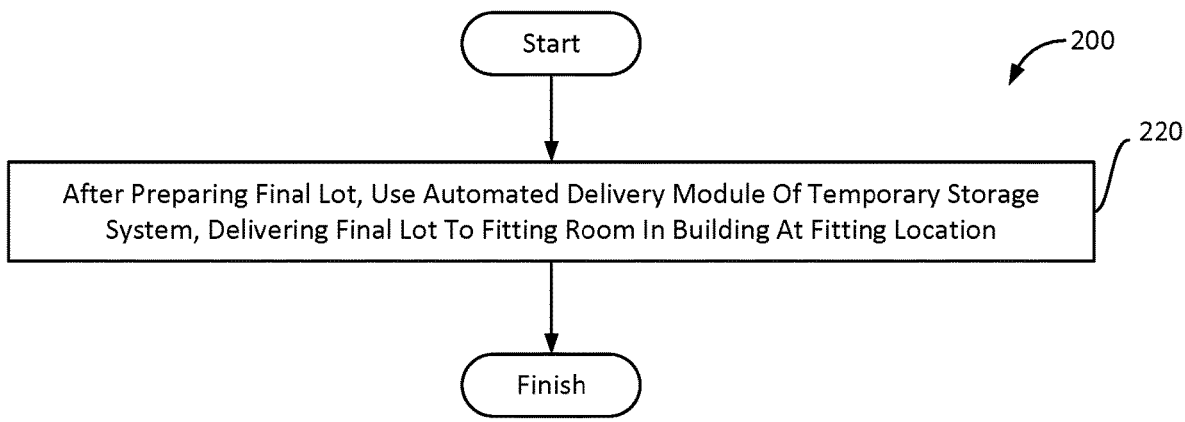

FIG. 2B illustrates method 200, in accordance with one or more implementations.

An operation 220 may include further including, after preparing the final lot, using an automated storage and retrieval system of the temporary storage system, delivering the final lot to a fitting room in the building at the fitting location. Operation 220 may be performed by one or more hardware processors configured by machine-readable instructions including a module that is the same as or similar to lot preparing module 124, in accordance with one or more implementations.

Figure 2C:
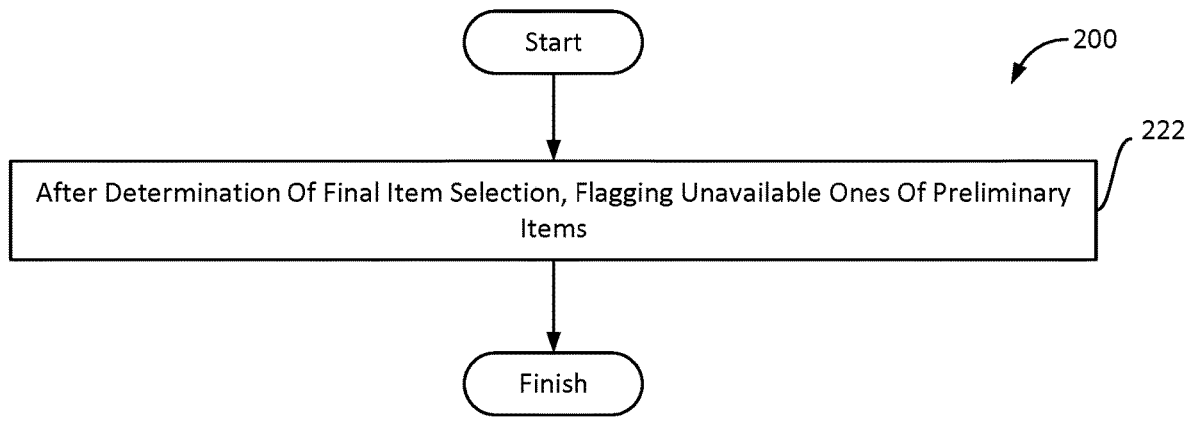

FIG. 2C illustrates method 200, in accordance with one or more implementations.

An operation 222 may include further including, after determination of the final item selection, flagging unavailable ones of the preliminary items. Operation 222 may be performed by one or more hardware processors configured by machine-readable instructions including a module that is the same as or similar to item flagging module 126, in accordance with one or more implementations.

Figure 2D:
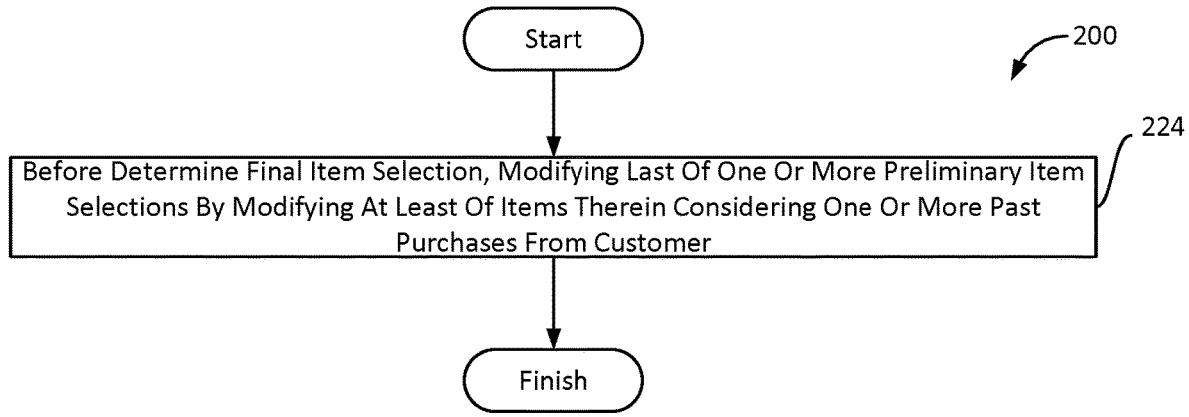

FIG. 2D illustrates method 200, in accordance with one or more implementations.

An operation 224 may include further including, before determining the final item selection, modifying the last of the one or more preliminary item selections by modifying at least one of the items therein considering one or more past purchases from the customer. Operation 224 may be performed by one or more hardware processors configured by machine-readable instructions including a module that is the same as or similar to item selection determination module 112, in accordance with one or more implementations.

Figure 2E:
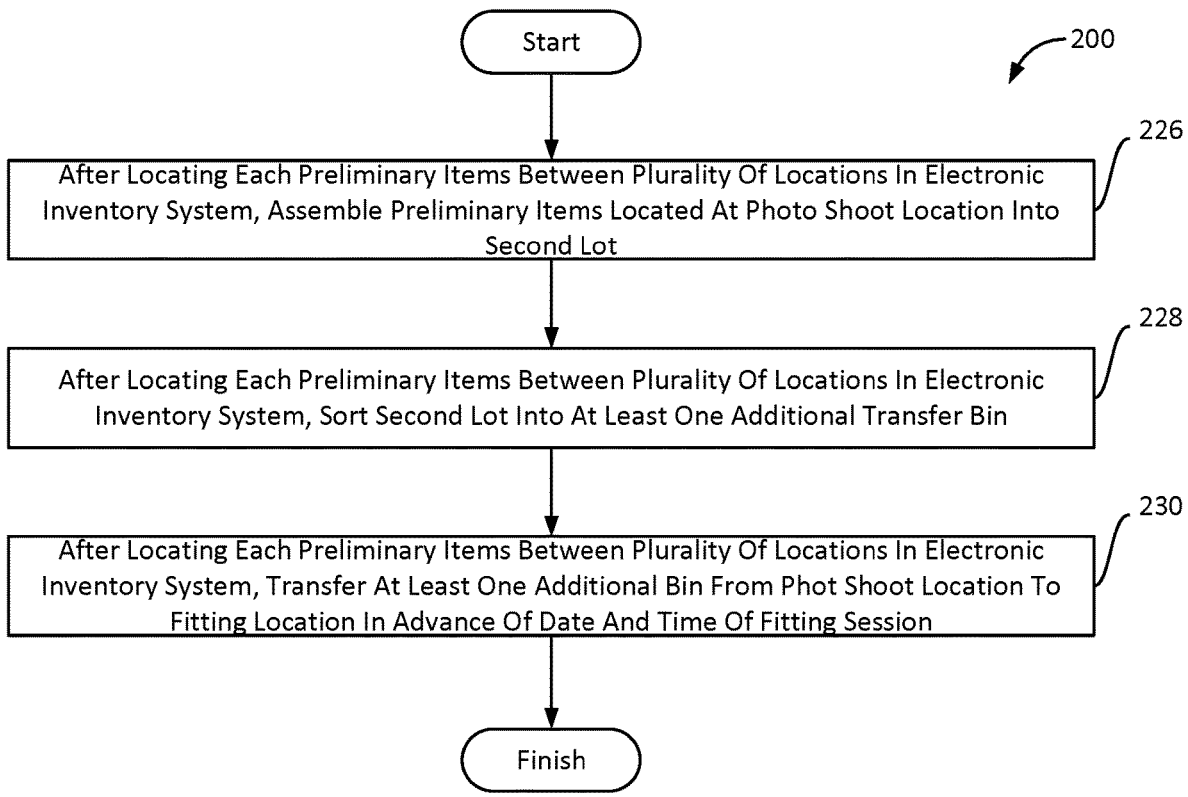
Figure 2F:
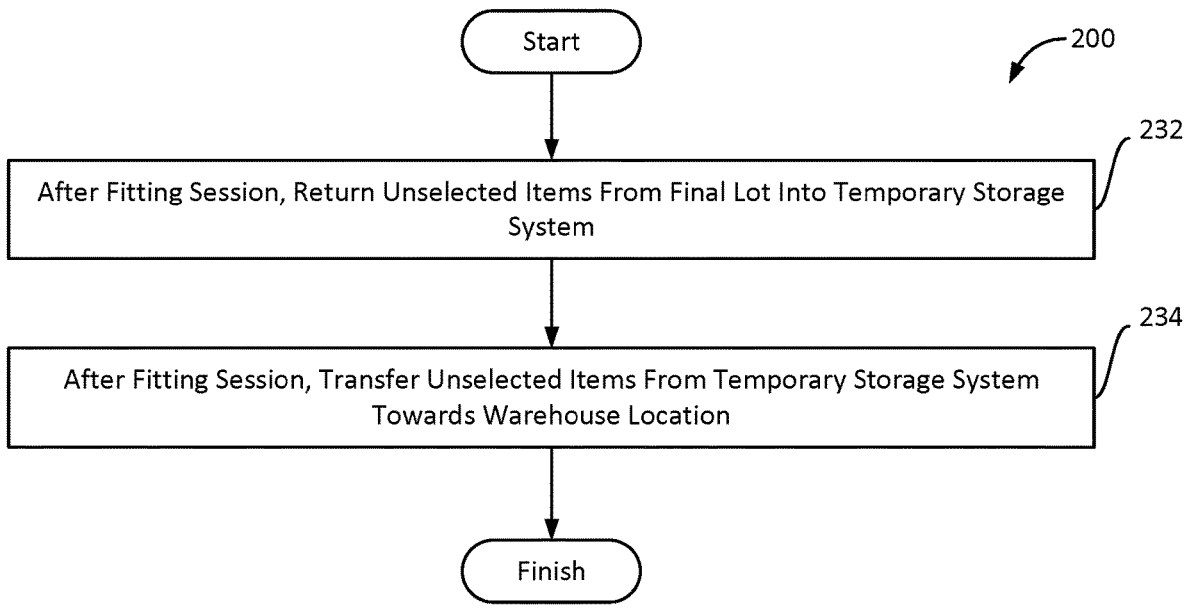

FIGS. 2E and/or 2F illustrate method 200, in accordance with one or more implementations.

An operation 226 may include after the fitting session, returning unselected items from the final lot into the temporary storage system. Operation 226 may be performed by one or more hardware processors configured by machine-readable instructions including a module that is the same as or similar to item returning module 128, in accordance with one or more implementations.

An operation 228 may include after the fitting session, transferring the unselected items from the temporary storage system towards the warehouse location. Operation 228 may be performed by one or more hardware processors configured by machine-readable instructions including a module that is the same as or similar to item transferring module 130, in accordance with one or more implementations.

The proposed appointment-booking process and supporting technology enables clients to select items from online assortment of items for try-on in a physical location (e.g. flagship retail space, pop-up, in-home, etc.). The try-on may be guided by a stylist. Prior to the appointment, the order may be evaluated and it may be suggested (e.g., by an artificial intelligence routine, based on analysis of the customer profile) to add items to ensure the best possible outcome for the client—with regards to sizing, item availability, or based on needs/requirements the client has expressed. Items are then held from the moment the appointment is booked, and no amount is charged for the service.

The proposed solution helps address several problems for clients. For instance, the client now has the ability to try-on from the online assortment (without immediately committing to a purchase). This is especially important when trying new brands or products for sizing and fit. The client may also have the ability to pre-schedule shopping time, with a guarantee that service (and even a preferred stylist) will be available. The client may also have the ability to immediately purchase and exit with desired items, while leaving items that are not selected for purchase (no need for cumbersome online return/shipping process). Furthermore, the client is not required to deposit before the try-on of the items of interest. The client may also edit their selection in the time leading up to the appointment (if they decide to add or remove something, for example). In addition, an artificial intelligence routine may suggest modification sot the selection and any member of the styling team can also edit the client's selection in the time leading up to the appointment The proposed solution helps address several problems for the seller. For instance. It becomes possible to perform assortment optimization. The entire online catalogue cannot feasibly fit in a single physical space and the appointment model allows to make the assortment shoppable for our clients without needing to have all items onsite. It also becomes possible to Plan and optimize resources. For instance, having clients book a specific time and day to come try on their items allows to staff and schedule accordingly. It also becomes possible to enhance recommendations to the clients. Understanding what clients express a desire to try-on compared to what is actually bought may be helpful and can then be used to feed recommendation engine, which may in turn be useful not only to the seller, but also to brand partners.

An additional example of implementation is described hereinafter with particular focus on an exemplary system that comprises a software platform that manages the details of an appointment and initiates the fulfillment of the appointment. A vertical lift module (VLM) is used as a storage solution (e.g., 52 trays with 3 locations (A, B, C))

The proposed solution can identify empty locations. For instance, a sequential selection may be based on availability 1A->1B->1C. The system will go through 52 trays, before going back to 1A (even if previous location get empty). The purpose is to enhance an even use of VLM trays (compared to constantly using the first half during lower traffic periods). The system returns an error if no location is available. The system also saves the location of appointment bins, mapping multiple bins to an appointment. The system can also retrieve location of bin inside the VLM. It is possible to turn on or turn off a given VLM location, e.g., in case a tray or specific section of a tray is broken. It may also be possible to directly transfer bins between floors and/or directly to fitting rooms.

When a customer or a stylist creates an appointment, the following elements are triggered in the system as a consequence:

A stylist is scheduled and a fitting room is reserved for the duration of the appointment. When the appointment is created by a client, the appointment duration is a function of the number of items selected. When the appointment is created by a stylist, the stylist selects the duration. In some implementations, the client has visibility on appointment start time only and not on the duration. The selected item(s) for the appointment are locked in the inventory. When the last unit is booked to an appointment, it cannot be purchased by an online customer or allocated to another appointment. The moment the appointment is confirmed, the item is reserved to the client.

The transfers allow to move the stock between different locations (store, photoshoot and warehouse) in order to fulfillment business requirements. Specifically, the transfers help having the merchandise ready at the right time and at the right moment. Multiple process use the transfers such as the store appointment/sales, the photoshoot process, the e-commerce sales requiring items not available at the warehouse.

In order for appointment items to get the store, transfers are triggered from warehouse and/or studio. Transfer created through appointment booking flow may be referred to as TAO (Transfer Appointment Order). A TAO is first created when an appointment is confirmed (or edited and items have been added or removed) and is in queue until it's released (e.g., either 24 hours before appointment date/time or when "forcing the release of the transfer" directly in the system). An appointment can be edited until the transfer is released. Following the release, the appointment can either be completed or cancelled.

In some implementations, the TAOs are associated with a single one of the multiple possible locations. It is therefore possible to have multiple TAOs per appointment. In some implementations, no TAO is created for item located at the store (e.g., the fitting location). Items can be added/removed from TAO(s) based on edits made by the client and/or the stylist. Items coming from the same location will all be grouped under the same TAO. Items are consolidated into bins. The bins are labelled with Appointment ID, TAO #. Bins are then loaded on delivery truck and transferred to the store. The location as of the bin may be updated in the system as being "in transit"

When receiving bins at the store, the storage bins are unloaded from the delivery truck. The location of the bin may be updated in the system as being "in store". This may be performed in the system by an inventory specialist. Two different approaches may then be taken: Processing content of the bin before insertion in the VLM or insertion in the VLM with the content of the bin remaining to be processed.

In a first option 1, the content is processed. The Appointment ID on the bin may be scanned (e.g., by the inventory specialist). Items within the bin can then be individually scanned. When an item is not part of the appointment, an error message is triggered. Likewise, when an item is scanned twice, an error message is triggered. The inventory specialist may indicate when all items in the bin have been scanned. When not all appointment items have been scanned, a message may be provided (e.g., "Are you sure you want to load in incomplete appointment?").

Once the bin is processed, the system returns an empty location number in the VLM and the VLM can be operated (e.g., directly by the system or by the inventory specialist) for the requested tray to be made available. It is then possible to scan the location in the VLM to validate tray and location. When the incorrect VLM slot is scanned compared to what the system expects, an error message appears and it is not possible to proceed. Once the correct slot is scanned, the bin is physically loaded in the VLM before it is closed. The bin is now physically and logically in the VLM for an upcoming appointment.

In a second option 2, the storage bin may be loaded in the VLM without processing. That may be required when high volume of bins are being received. Marking the bin as "to be processed" does not require to scan the items and the bin will show as to be processed in inventory flow. The system may then provide a mode where bins to be processed are brought to the inventory specialist for processing as per option 1.

In order to prepare for an appointment, the system may offer a process by which the appointment bin(s) is retrieved in advance of the pre-booked appointment time. This may be performed, for instance, by a merchandise coordinator while preparing items for the client.

An appointment is selected in the system (e.g., from a list). The VLM location code for the bin(s) is provided and provided to operate the VLM system to bring the bins (e.g., provided by the system to the VLM or entered in the VLM by the merchandise coordinator). in some implementations, the Appointment ID is scanned on the bin. When the wrong bin is scanned, an error message is provided. Otherwise, the system indicates the bin as taken out of the VLM. The VLM can then be closed.

The items for the appointment as retrieved from the bin(s) and prepared for the try-on. In some implementation, the retrieval of the bin may be performed directly at a fitting room. The bin should be stored outside of VLM for the duration of appointment. When an appointment has more than one bin in the VLM, the system may ask to load out the next bin for the appointment. Upcoming appointments may include appointments that are past their start time, but for which the client has not yet been checked in. This is to accommodate for clients who arrive late or on a subsequent day.

Upon completion of an appointment, it may be needed to return some or all of the items to warehouse. Unsold items can then be returned to the VLM for storage (e.g., by the merchandise coordinator) until they are processed (e.g., by the inventory specialist) to be transferred back to the warehouse or returned to store stock.

For pre-booked appointments, upon appointment completion, items that were left in the fitting room (unsold) are retrieved. For instance, the appointment ID may be scanned (e.g., on bin that was kept out of VLM for duration of appointment), and the system then displays all items that were originally part of this appointment, and will indicate which have been sold.

The unsold items are then individually scanned. Once all items have been scanned, a VLM location is provided for the system, which then provided to the VLM (by the operator or by the system). When tray arrives, the VLM location is scanned and the bin is physically loaded into the VLM location. The bin will now be considered under a "Completed Appointment". The bins may then be returned to the warehouse. 5 different exemplary scenarios are provided where goods are returned to the warehouse from the store:

1) The client orders an item to the store as part of a TAO, tries it on, but decides not to buy (regular return to warehouse/purge process).

2) Items from store stock are sent back to the warehouse as part of the regular merchandising refresh process (regular return to warehouse/purge process).

3) The item is sold at the store, but the client wishes to ship the item instead.

4) The item is sold online, and requested by warehouse.

5) The client returns an item after buying it

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The present technology is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities. The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computing platform configured for preparing items for a customer in advance of a customer fitting session, the computing platform comprising:
    a non-transient computer-readable storage medium having executable instructions embodied thereon; and
    one or more hardware processors configured to execute the instructions to:
        receive, using the one or more hardware processors, one or more preliminary item selections from the customer through an online portal;
        determine, using the one or more hardware processors, a fitting date and time for the customer fitting session at a fitting location;
        determine, using the one or more hardware processors, a final item selection from the last of the one or more preliminary item selections not more than 48 hours before the fitting session, the final item selection comprising a plurality of items from an available assortment of items, the available assortment of items being maintained between a plurality of locations comprising at least the fitting location and a warehouse location, the customer not committing to purchase any of the items in the final item selection;
    after determination of the final item selection:
        lock the one or more items in the final item selection from the available assortment of items;
        locate each item of the final item selection between the plurality of locations in an electronic inventory system;
        configure an automated mechanical system to assemble the final item selection located at the warehouse location into a lot and store the lot into at least one transfer bin;
        scan, using a first scanning device, the at least one bin for transfer from the warehouse location to the fitting location in advance of the date and time of the fitting session;
        at or before the date of the fitting session:
            scan, using a second scanning device, contents of the transferred at least one bin to confirm the accuracy of the contents with respect to the final item selection;
            before the time of the fitting session, prepare a final lot at the fitting location from the transferred at least one bin; and
            before the time of the fitting session, store the prepared final lot in a temporary storage system operating in a building at the fitting location and configure an automated storage and retrieval system of the temporary storage system to deliver the final lot to a fitting room in the building at the fitting location.

2. The computing platform of claim 1, wherein the automated storage and retrieval system comprises a plurality of trays.

3. The computing platform of claim 1, wherein the one or more hardware processors are further configured by the instructions to, after determination of the final item selection, flag unavailable ones of the preliminary items.

4. The computing platform of claim 1, wherein the one or more hardware processors are further configured by the instructions to, before determining the final item selection, modify the last of the one or more preliminary item selections by modifying at least one of the items therein considering one or more past purchases from the customer.

5. The computing platform of claim 4, wherein modifying the last of the one or more preliminary item comprises adding different sizes of an item in the last of the one or more preliminary item selections.

6. The computing platform of claim 4, wherein modifying the last of the one or more preliminary item comprises adding different models of an item in the last of the one or more preliminary item selections.

7. The computing platform of claim 4, wherein modifying the last of the one or more preliminary item comprises adding one or more different products in relation to an item in the last of the one or more preliminary item selections.

8. The computing platform of claim 1, wherein the one or more hardware processors are further configured by the instructions to, after the fitting session:
return unselected items from the final lot into the temporary storage system;
unlock the unselected items from the available assortment of items; and
after the fitting session, transfer the unselected items from the temporary storage system towards the warehouse location.

9. The computing platform of claim 8, wherein returning the unselected items from the final lot into the temporary storage system comprising using a rejection bin outside of the automated storage and retrieval system of the temporary storage system and wherein transferring the unselected items from the temporary storage system towards the warehouse location comprises transferring the rejection bin from the fitting location to the warehouse location.

10. The computing platform of claim 1, wherein the plurality of locations also comprises a photo shoot location and the one or more hardware processors are further configured by the instructions to, after locating each of the preliminary items between the plurality of locations in the electronic inventory system:
assemble the preliminary items located at a photo shoot location into a second lot;
sort the second lot into at least one additional transfer bin; and
transfer the at least one additional bin from the photo shoot location to the fitting location in advance of the date and time of the fitting session.

11. A method for preparing items for a customer in advance of a customer fitting session comprising:
receiving one or more preliminary item selections from the customer through an online portal;
determining a fitting date and time for the customer fitting session at a fitting location;
determining a final item selection from the last of the one or more preliminary item selections not more than 48 hours before the fitting session, the final item selection comprising a plurality of items from an available assortment of items, the available assortment of items being maintained between a plurality of locations comprising at least the fitting location and a warehouse location, the customer not committing to purchase any of the items in the final item selection;
after determination of the final item selection:
locking the one or more items in the final item selection from the available assortment of items;
locating each item of the final item selection between the plurality of locations in an electronic inventory system;
configuring an automated mechanical system to assemble the final item selection located at the warehouse location into a lot and store the lot into at least one transfer bin;
and
transferring the at least one bin from the warehouse location to the fitting location in advance of the date and time of the fitting session; and
at or before the date of the fitting session, before the time of the fitting session:
scanning, using a scanning device, contents of the transferred at least one bin to confirm the accuracy of the contents with respect to the final item selection
preparing a final lot at the fitting location from the transferred at least one bin; and
storing the prepared final lot in a temporary storage system operating in a building at the fitting location; and
configuring an automated storage and retrieval system of the temporary storage system to deliver the final lot to a fitting room in the building at the fitting location.

12. The method of claim 11, wherein using the automated storage and retrieval system comprises storing the plurality of items in trays of the automated storage and retrieval system.

13. The method of claim 11, further comprising, after determination of the final item selection, flagging unavailable ones of the preliminary items.

14. The method of claim 11, further comprising, before determining the final item selection, modifying the last of the one or more preliminary item selections by modifying at least one of the items therein considering one or more past purchases from the customer.

15. The method of claim 14, wherein modifying the last of the one or more preliminary item comprises adding different sizes of an item in the last of the one or more preliminary item selections.

16. The method of claim 14, wherein modifying the last of the one or more preliminary item comprises adding different models of an item in the last of the one or more preliminary item selections.

17. The method of claim 14, wherein modifying the last of the one or more preliminary item comprises adding one or more different products in relation to an item in the last of the one or more preliminary item selections.

18. The method of claim 11, further comprising, after the fitting session:
returning unselected items from the final lot into the temporary storage system;
unlocking the unselected items from the available assortment of items; and
after the fitting session, transferring the unselected items from the temporary storage system towards the warehouse location.

19. The method of claim 18, wherein returning the unselected items from the final lot into the temporary storage system comprising using a rejection bin outside of the automated storage and retrieval system of the temporary storage system and wherein transferring the unselected items from the temporary storage system towards the warehouse location comprises transferring the rejection bin from the fitting location to the warehouse location.

20. The method of claim 11, wherein the plurality of locations also comprises a photo shoot location, the method further comprising, after locating each of the preliminary items between the plurality of locations in the electronic inventory system:

assembling the preliminary items located at a photo shoot location into a second lot;

sorting the second lot into at least one additional transfer bin; and transferring the at least one additional bin from the photo shoot location to the fitting location in advance of the date and time of the fitting session.

21. A system configured for preparing items for a customer in advance of a customer fitting session, the system comprising:

one or more hardware processors configured by machine-readable instructions to:

execute an online portal that:

receives one or more preliminary item selections from the customer through;

determines a fitting date and time for the customer fitting session at a fitting location;

determines a final item selection from the last of the one or more preliminary item selections not more than 48 hours before the fitting session, the final item selection comprising a plurality of items from an available assortment of items, the available assortment of items being maintained between a plurality of locations comprising at least the fitting location and a warehouse location, the customer not committing to purchase any of the items in the final item selection;

execute a processing agent that, after determination of the final item selection:

locks the one or more items in the final item selection from the available assortment of items;

locates each item of the final item selection between the plurality of locations in an electronic inventory system;

configures an automated mechanical system to assemble the final item selection located at the warehouse location into a lot and store the lot into at least one transfer bin;

scans, using a first scanning device, the at least one bin for transfer from the warehouse location to the fitting location in advance of the date and time of the fitting session;

execute the processing agent that, at or before the date of the fitting session:

scans, using a second scanning device, contents of the transferred at least one bin to confirm the accuracy of the contents with respect to the final item selection;

before the time of the fitting session, prepare a final lot at the fitting location from the transferred at least one bin;

before the time of the fitting session, store the prepared final lot in a temporary storage system operating in a building at the fitting location; and after preparing the final lot, configure an automated storage and retrieval system of the temporary storage system to deliver the final lot to a fitting room in the building at the fitting location.

22. The system of claim 21, wherein the automated storage and retrieval system comprises a plurality of trays.

23. The system of claim 21, wherein the one or more hardware processors are further configured by machine-readable instructions to, after determination of the final item selection, flag unavailable ones of the preliminary items.

24. The system of claim 23, wherein the one or more hardware processors are further configured by machine-readable instructions to, before determining the final item selection, modify the last of the one or more preliminary item selections by modifying at least one of the items therein considering one or more past purchases from the customer.

25. The system of claim 24, wherein modifying the last of the one or more preliminary item comprises adding different sizes of an item in the last of the one or more preliminary item selections.

26. The system of claim 24, wherein modifying the last of the one or more preliminary item comprises adding different models of an item in the last of the one or more preliminary item selections.

27. The system of claim 24, wherein modifying the last of the one or more preliminary item comprises adding one or more different products in relation to an item in the last of the one or more preliminary item selections.

28. The system of claim 21, wherein the one or more hardware processors are further configured by machine-readable instructions to, after the fitting session:

return unselected items from the final lot into the temporary storage system;

unlock the unselected items from the available assortment of items; and transfer the unselected items from the temporary storage system towards the warehouse location.

29. The system of claim 28, wherein returning the unselected items from the final lot into the temporary storage system comprises using a rejection bin outside of the automated storage and retrieval system of the temporary storage system and wherein transferring the unselected items from the temporary storage system towards the warehouse location comprises transferring the rejection bin from the fitting location to the warehouse location.

30. The system of claim 21, wherein the plurality of locations also comprises a photo shoot location and wherein the one or more hardware processors are further configured by machine-readable instructions to, after locating each of the preliminary items between the plurality of locations in the electronic inventory system:

assemble the preliminary items located at a photo shoot location into a second lot;

sort the second lot into at least one additional transfer bin; and transfer the at least one additional bin from the photo shoot location to the fitting location in advance of the date and time of the fitting session.

31. A non-transient computer-readable storage medium having instructions embodied thereon, the instructions being executable by one or more processors to perform a method for preparing items for a customer in advance of a customer fitting session, the method comprising:

receiving one or more preliminary item selections from the customer through an online portal;

determining a fitting date and time for the customer fitting session at a fitting location;

determining a final item selection from the last of the one or more preliminary item selections not more than 48 hours before the fitting session, the final item selection comprising a plurality of items from an available assortment of items, the available assortment of items being maintained between a plurality of locations comprising at least the fitting location and a warehouse location, the customer not committing to purchase any of the items in the final item selection;

after determination of the final item selection:

locking the one or more items in the final item selection from the available assortment of items;

locating each item of the final item selection between the plurality of locations in an electronic inventory system;

configuring an automated mechanical system to assemble the final item selection located at the warehouse location into a lot and store the lot into at least one transfer bin; and transferring the at least one bin from the warehouse location to the fitting location in advance of the date and time of the fitting session;

at or before the date of the fitting session:

scanning, using a scanning device, contents of the transferred at least one bin to confirm the accuracy of the contents with respect to the final item selection before the time of the fitting session, preparing a final lot at the fitting location from the transferred at least one bin;

before the time of the fitting session, storing the prepared final lot in a temporary storage system operating in a building at the fitting location; and after preparing the final lot, configuring an automated storage and retrieval system of the temporary storage system to deliver the final lot to a fitting room in the building at the fitting location.

32. The computer-readable storage medium of claim 31, wherein using the automated storage and retrieval system of the temporary storage system comprises storing the plurality of items in trays of the automated storage and retrieval system.

33. The computer-readable storage medium of claim 31, wherein the method further comprises, after determination of the final item selection, flagging unavailable ones of the preliminary items.

34. The computer-readable storage medium of claim 31, wherein the method further comprises, before determining the final item selection, modifying the last of the one or more preliminary item selections by modifying at least one of the items therein considering one or more past purchases from the customer.

35. The computer-readable storage medium of claim 34, wherein modifying the last of the one or more preliminary item comprises adding different sizes of an item in the last of the one or more preliminary item selections.

36. The computer-readable storage medium of claim 34, wherein modifying the last of the one or more preliminary item comprises adding different models of an item in the last of the one or more preliminary item selections.

37. The computer-readable storage medium of claim 34, wherein modifying the last of the one or more preliminary item comprises adding one or more different products in relation to an item in the last of the one or more preliminary item selections.

38. The computer-readable storage medium of claim 31, wherein the method further comprises, after the fitting session:

returning unselected items from the final lot into the temporary storage system;

unlocking the unselected items from the available assortment of items; and after the fitting session, transferring the unselected items from the temporary storage system towards the warehouse location.

39. The computer-readable storage medium of claim 38, wherein returning the unselected items from the final lot into the temporary storage system comprising using a rejection bin outside of the automated storage and retrieval system of the temporary storage system and wherein transferring the unselected items from the temporary storage system towards the warehouse location comprises transferring the rejection bin from the fitting location to the warehouse location.

40. The computer-readable storage medium of claim 31, wherein the plurality of locations also comprises a photo shoot location, the method further comprising, after locating each of the preliminary items between the plurality of locations in the electronic inventory system:

assemble the preliminary items located at a photo shoot location into a second lot;

sort the second lot into at least one additional transfer bin; and transfer the at least one additional bin from the photo shoot location to the fitting location in advance of the date and time of the fitting session.

* * * * *